United States Patent [19]

Heizer

[11] Patent Number: 5,249,290
[45] Date of Patent: Sep. 28, 1993

[54] METHOD OF AND APPARATUS FOR OPERATING A CLIENT/SERVER COMPUTER NETWORK

[75] Inventor: Isaac J. Heizer, Little Silver, N.J.

[73] Assignee: AT&T Bell Laboratories, Murray Hill, N.J.

[21] Appl. No.: 658,827

[22] Filed: Feb. 22, 1991

[51] Int. Cl.$^5$ .............................................. G06F 12/00
[52] U.S. Cl. ........................... 395/650; 364/DIG. 1; 364/281.3; 364/281.6; 364/281.0
[58] Field of Search ......................................... 395/650

[56] References Cited

U.S. PATENT DOCUMENTS 4,949,248  8/1990  Caro .................................... 364/200
5,031,089  7/1991  Liu et al. ............................. 364/200

OTHER PUBLICATIONS

"DOS Server Program for UNIX Computers", by I. J. Heizer, published in *AT&T Technology*, vol. 4, No. 1, 1989, 56-61.

*Primary Examiner*—Gareth D. Shaw
*Assistant Examiner*—A. Katbab
*Attorney, Agent, or Firm*—John A. Caccuro

[57] ABSTRACT

A server of a client/server network uses server processes to access shared server resources in response to service requests from client computers connected to the network. The server uses a measured workload indication to assign a received client service request to a server process. In one embodiment the measured workload indication is determined in response to an input from the server's administrator specifying the number of clients (N) which may request service from the server. Using the number N, the server accesses a predefined table to determine the number of clients that may be assigned to each process. In another embodiment, a busy indicator provides a measured workload indication for each active process. The server uses the busy indicator to assign a new client service request to the least busy process.

20 Claims, 4 Drawing Sheets

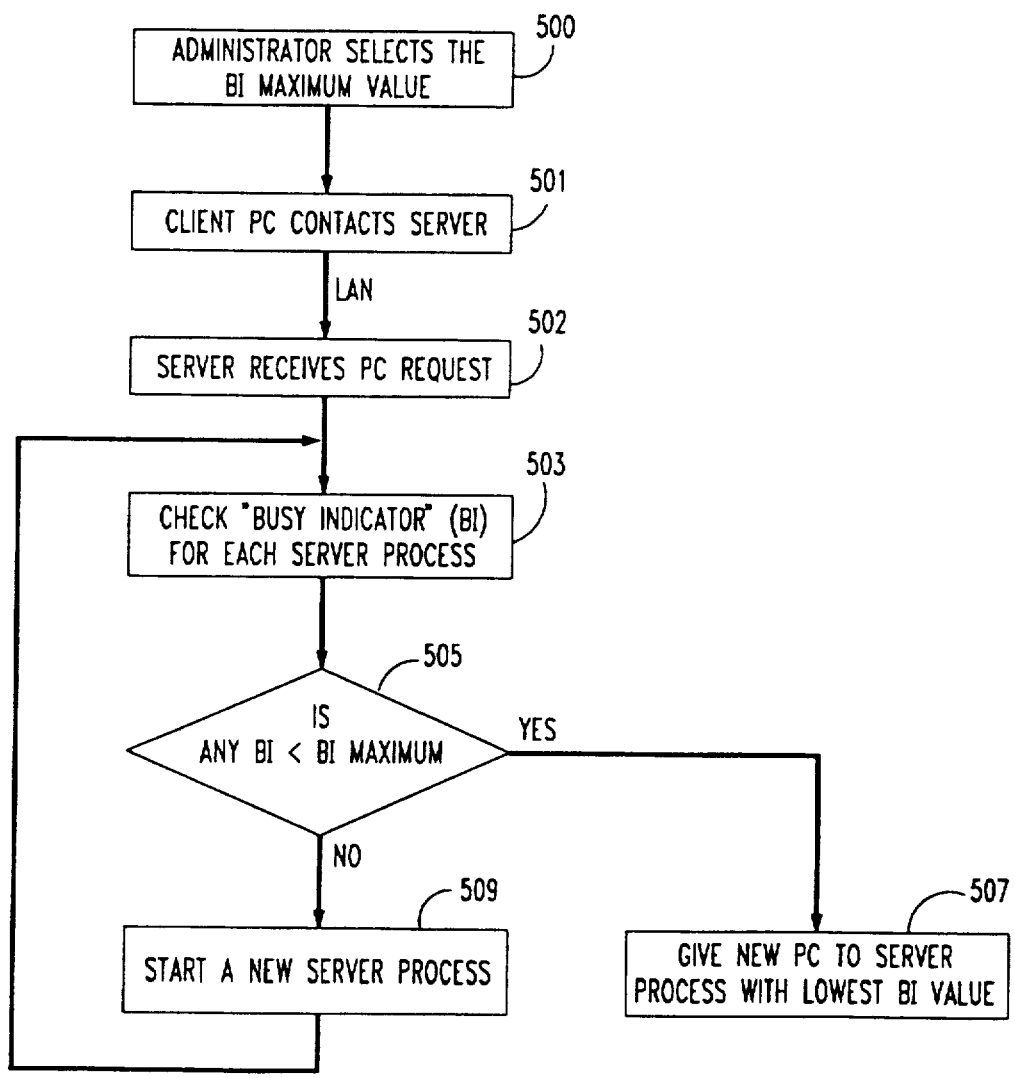

METHOD OF AND APPARATUS FOR OPERATING A CLIENT/SERVER COMPUTER NETWORK

TECHNICAL FIELD

This invention relates to computer networks and, more particularly, to a method and apparatus for enabling computers on a network to access a common network resource thereof.

BACKGROUND OF THE INVENTION

Local area networks (LANS) now enable personal computers (PCs) or terminals (typically referred to as clients) to share resources, such as disk storage and printers, typically located at a host or server. This type of network is generally referred to as a client/server network. Known client/server networks require a separate server process for each service request received from a client. Undesirably, requiring that a separate process be created for each client request quickly exhausts available server processes and results in an overload of the server. Network server architecture enhancements now enable a single server process to handle requests from a predefined number of clients to reduce the likelihood of server overload. In such an arrangement, clients are assigned to a server process until the predefined number is reached, whereupon a new server process is created to handle additional clients. However, since the network server designer never knows how many client service requests will be made at any point in time, or what types of service requests (batch or interactive) they will be, it is difficult to effectively predefine the number of clients to assign to a server process to optimize server performance. Since the procedure for assigning a new client service request to an existing server process or to a new server process is critical to server performance, there is a continuing need to further improve this procedure.

SUMMARY OF THE INVENTION

In the present invention, a network server provides improved allocation of processes to network clients to improve server performance. According to the invention, the server uses a workload indication of a server process to determine when to assign a received client service request to another server process. In one embodiment, the workload indication is compared to a predetermined workload indication determined in response to an input from the server's administrator specifying the number of clients (N) which may request service from the server. Using the number N, the server accesses a predefined table to determine the number of clients that may be assigned to each process.

In another embodiment, the server starts with the first entry in the table (entry for handling the fewest number of clients) to determine the optimum number of clients to assign to a process. When the number of clients (N) exceeds the maximum number for the first entry, the server accesses the next entry, to determine the optimum number of clients to assign to a process.

In yet another embodiment, a busy indicator provides a measured workload indication for each active process. Using the busy indicator values, the server assigns a new client service request to the least busy process.

BRIEF DESCRIPTION OF THE DRAWING

In the drawing,

FIG. 4 shows a table which enables the server program of FIG. 3 to determine the number of clients which may be assigned to each server process; and FIG. 5 shows a flow chart describing a second method of enabling the server program to assign a client to a server process.

DETAILED DESCRIPTION

Figure 1:
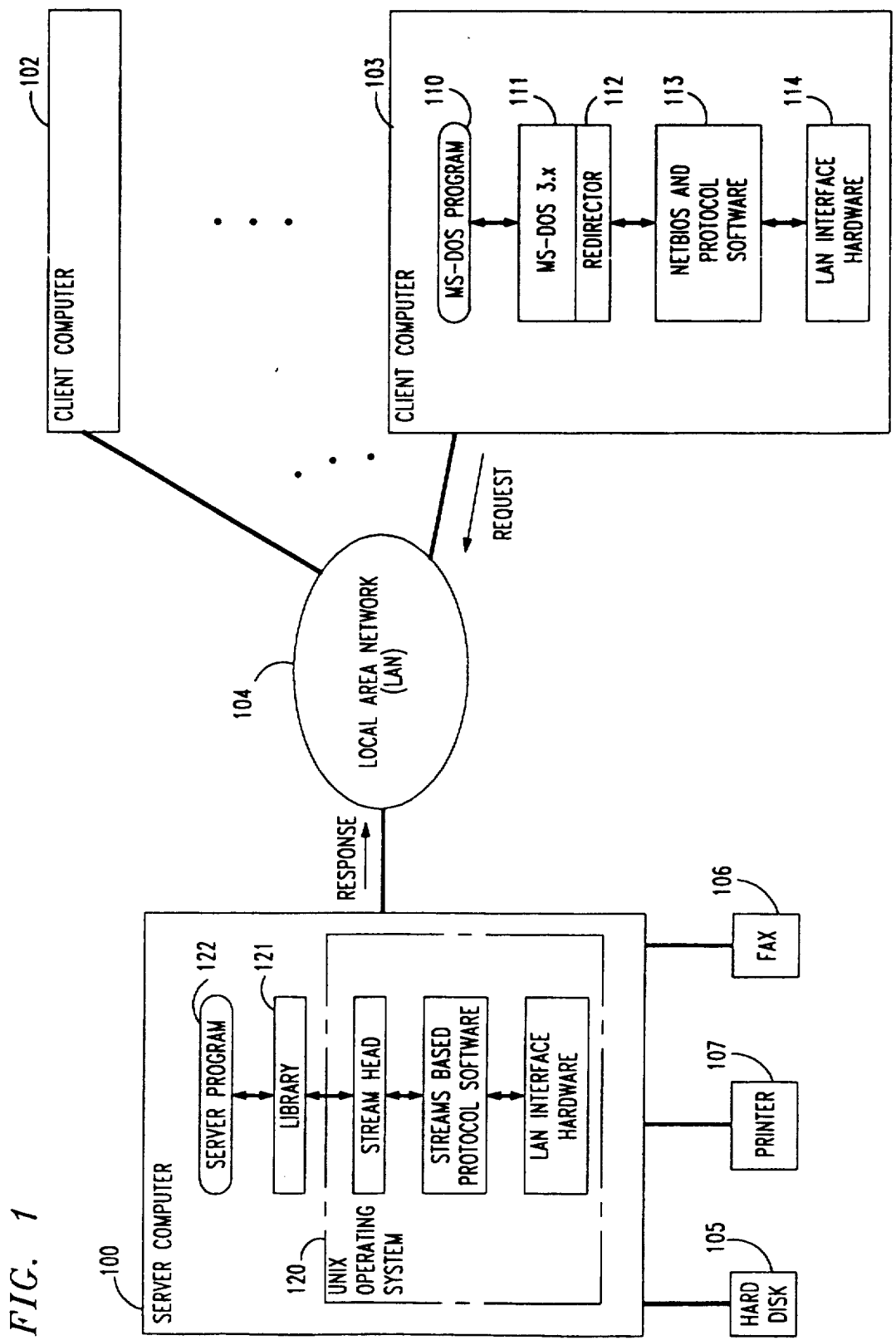
FIG. 1 is a block diagram of a client/server network including a server computer in which the present invention may be utilized.

Shown in FIG. 1 is a block diagram of an illustrative client/server system or network in which the present invention may be utilized. The network includes a server computer 100 connected to a plurality of client terminals, workstations or computers 102, 103 via a local area network (LAN) 104. Server computer 100, illustratively, provides the client computers 102, 103 shared access to hard disk 105, facsimile machine (fax) 106 and printer 107. Note that client computers 102, 103 may each also have a hard disk, not shown. Shared files and application programs are stored in hard disk 105.

In one illustrative arrangement, each of the one or more client computers 102, 103 may be a personal computer (PC) which operates using the well-known MS-DOS ® operating system or OS/2 ® operating system. (MS-DOS is a registered trademark of the Microsoft Corporation. OS/2 is a registered trademark of IBM). The LAN 104 may, illustratively, be the AT&T STAR-LAN system. The server computer 100 may, illustratively, be an AT&T 6386 WorkGroup System computer running on UNIX ® System V Release 3.2 operating system. (UNIX is a registered trademark of Unix Systems Laboratories). The client PCs 102, 103 and server computer 100 may use the AT&T Star-GROUP ® system software. This StarGROUP system software allows MS-DOS and OS/2 client PCs to transparently share files, software, and printers on a LAN.

The server computer 100 running the server program 122 on top of the UNIX operating system 120 can support one or more large hard disks (e.g., 105) and one or more printers (e.g., 107) that can be made available to client PCs 102, 103 on the LAN network 104. To make a resource available, a name (e.g., sharename) is associated with the printer 107 or directory on the disk 105.

Software on the client computer 103 interacts with the server program 122 on the server computer 100 to allow access to server resources 105, 106 and 107 by client program I 10. Specifically, system calls referencing server resources 105, 106 and 107 are packaged into request messages by the redirector 112 and transmitted to the server program 122 by the network software 113 (known in the art as netbios and protocol software) over the local area network 104. The server program 122 processes the request and sends a response to the client computer 103.

A more detailed description of the operating aspects of the client/server interaction is described in the article entitled "DOS Server Program For UNIX Computers"

by I. J. Heizer, published in AT&T Technology, Volume 4, Number One, 1989.

Figure 2:
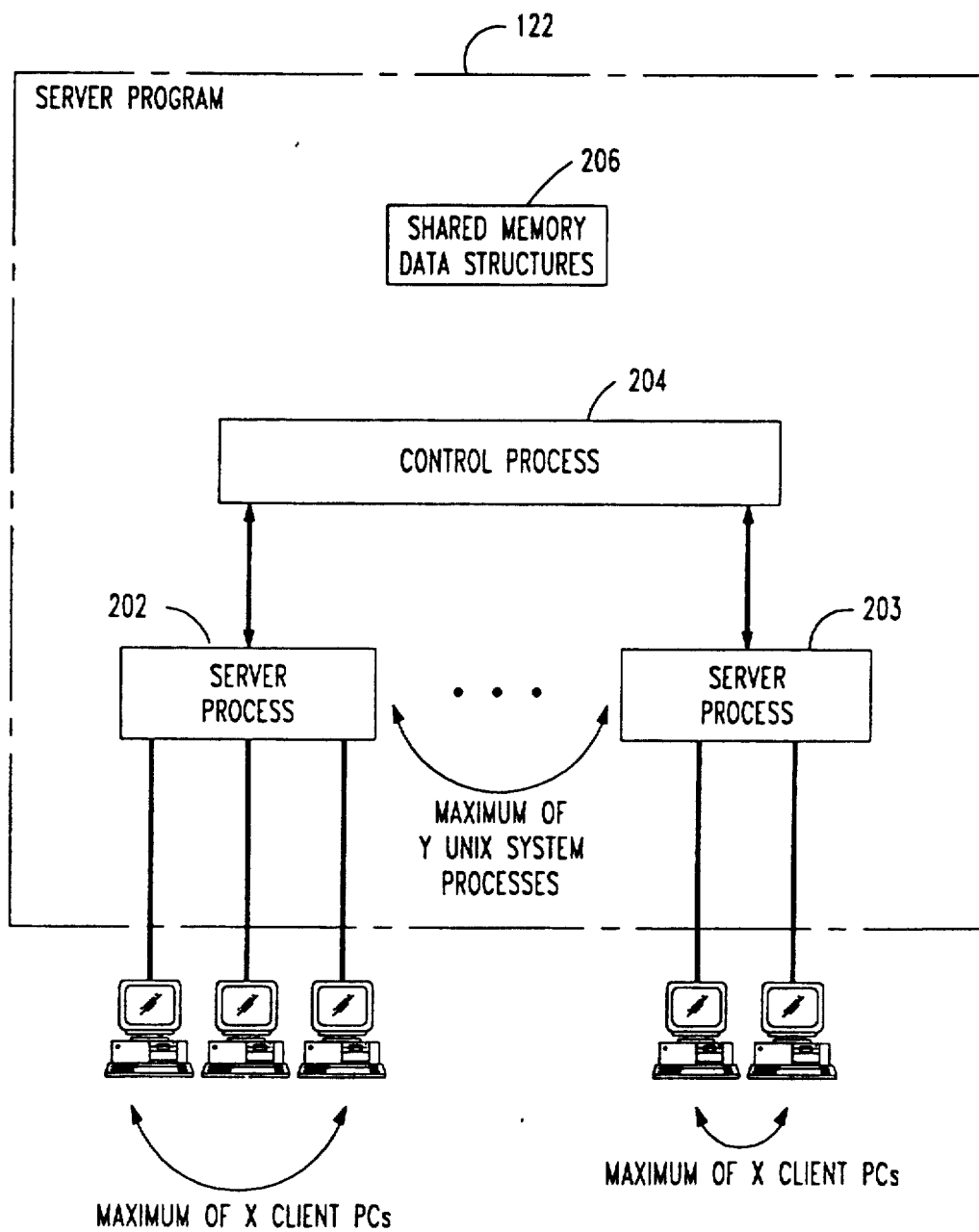
FIG. 2 is an illustrative block diagram of the architecture of the server program.

The server program 122 architecture, as shown in FIG. 2, is composed of one control process 204, a set of server processes 202, 203 and an area of shared memory 206. Each server process 202, 203 is responsible for up to X clients. Thus, a set of M server processes, 202, 203, supports a total of M*X simultaneous clients. All shared state information is maintained in shared memory 206.

The primary function of server processes 202, 203 is to receive a client request, process the request and send a response. The control process 204 accepts new clients and acts as a kind of switchboard for the server processes 202, 203.

Conceptually, the control process 204 sits at the top of the hierarchy. On startup, the control process 204 starts one server process 202. The control process 204 and each server process are connected with interprocess communications channels. When the control process 204 accepts new clients, it decides which of the server processes 202, 203 should handle the client. If no existing server process can handle the new client, a new server process is created.

In accordance with the present invention, the server uses a measured workload indication to determine the number of clients (service requests) that can be assigned to each server process and assigns a new client to a server process in accordance with that determination. More particularly, this determination may be made in one of two ways. In one embodiment the measured workload indication is determined in response to an input from the server's administrator specifying the number of clients (N) which may request service from the server. Using the number N, the server accesses table T1 (shown in FIG. 4) to determine the number of clients that may be assigned to each process. The table T1 lists, for different groupings of clients N, how many of these clients may be assigned to a server process. The contents of table T1 is set up at the factory. The client assignment process using table T1 is described in FIG. 3.

In a second embodiment, shown in FIG. 5, the server program uses a busy indicator (BI) as a measured workload indication for each server process. The server uses the busy indicator (BI) to determine which server process is least busy and, hence, can be assigned a new client.

Figure 3:
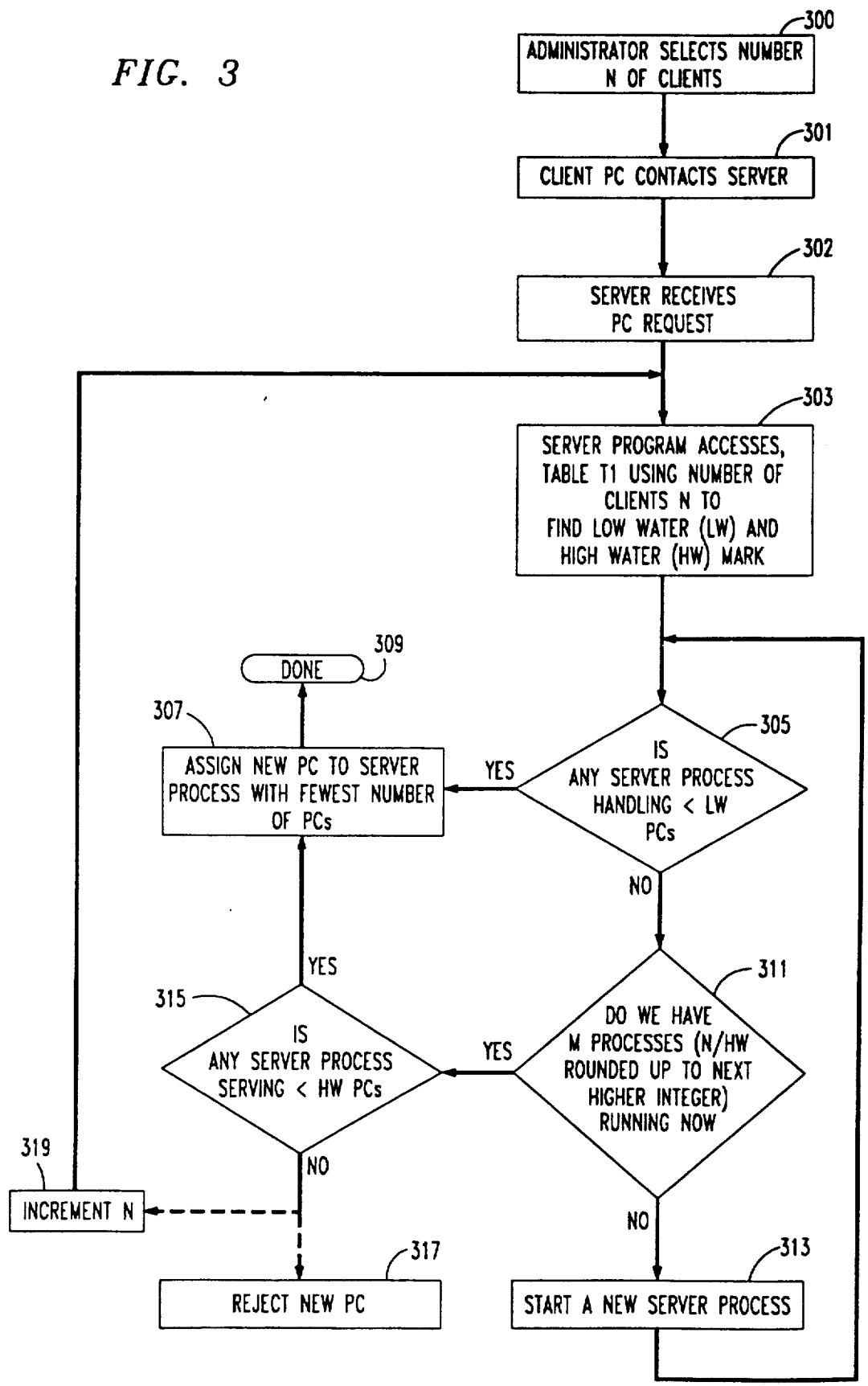
FIG. 3 shows a flow chart describing a first method of enabling the server program to assign a client to a server process.

With joint reference to FIGS. 2, 3 and 4 we describe the first method of assigning a new client to an existing or a new server process. When the server program 122 is initialized, in step 300, the network or server administrator selects the maximum number of clients N to be handled by the server program 122. We assume that N was selected by the administrator to be 20.

In step 301, a client PC (also referred to herein as a PC) makes a service request, via LAN 104, to server computer 100 using the previously described process. In step 302, the server computer 100 receives the PC request. In step 303, server program 122 indexes or accesses table T1, using the maximum number of clients (N) previously selected by the system administrator to determine low water (LW) and high water (HW) marks. The LW number indicates the minimum number of clients that are to be assigned to an existing server process 202 before a new server process is created. The HW number indicates, for the selected number N of clients, the maximum number of clients that can be assigned to a server process 202, after all available server processes have been activated.

For our first example, we assumed N was selected to be 20. As previously noted, when the server program is "booted" on startup, one server process (e.g., 202 is spawned or activated). When the first client PC contacts the server program 122, after steps 301 to 303 are completed, in step 305 the control process 204 checks if any server process 202 is handling LW or less PCs. At this point in our example, only one server process 202 is active and since this was the first PC request, the answer to step 305 is yes. Hence, in step 307 the new PC request is given to the activated server process 202 and in step 309 the procedure is done. A second PC request follows the same sequence of steps, 301-309, and the activated server process 202 is now handling two PCs. A third PC request follows steps 301, 303, 305 and, since the activated server process 202 is handling two PCs, the answer in step 305 is no. Thus, step 311 is performed since the activated server process is already handling two PCs. In step 311, control process 204 determines the maximum number of server processes (M) that can be started by dividing N by HW and rounding up to the next higher integer. In our example, N is 20 and HW is 5, so only 4 server processes can be started. Thus, in step 311 since only one server process 202 has been activated (which is less than the maximum of M or 4 which are possible), a new server process 203 is started in step 313. Control returns to step 305 where it is determined that the newly started server process 203 is handling less than LW PCs, and consequently steps 307 and 309 are performed.

When a fourth PC request is received, it follows steps 301, 303, 305, 307 and 309. When a fifth PC request is received, a third server process is formed, in step 313, and the PC request assigned to it via steps 301, 303, 305, 311, 313, 305, 307 and 309. The sixth and eighth PC requests are handled in the same manner as the fourth PC request. The seventh PC request is handled like the fifth PC request.

When the ninth PC request is received steps 301, 303 and 305 are completed and in step 311, since all four (i.e., M) server processes are started, step 315 is performed. In step 315, since there is a server process serving less than HW PCs (note HW=5 in our example where N=20), steps 307 and 309 are performed. Note that actually all four of the server processes are handling only two client requests each.

The above sequence of steps continues for PC requests 10 through 20, each new request being given by step 307 to the server process having the fewest number of PC requests. Note after PC request 20, each server process is handling HW=5 PC requests. When the 21st PC request is received, in one embodiment of the present invention, the PC request is handled via steps 301-305, 307, 315 and rejected as shown in step 317. In an alternative embodiment, in step 319 the number N is incremented to 21 and control returns to step 303. Since N equals 21 the same LW and HW numbers are utilized, but now N divided by HW is 4.25 which is rounded up to 5. Thus, PC request number 21 would start a fifth server process. PC requests 22 through 25 would also be directed to this new server process following the same above-described sequence of steps.

When PC request number 26 is received, steps 301, 303, 305, 311, 315 are performed and, in step 319, N is incremented. Thereafter, when control is returned to step 303, since N now exceeds 25, N falls into a new maximum number of clients' groupings of table T1 of FIG. 4. That is, N moves from grouping 402 to grouping 403 of table T1 of FIG. 4. In the grouping 76<N<36. The LW is still two and HW is now six. Thus, PC request number 26 would proceed from step 303, 305, 311, 315, 307 and 309 and be assigned to the first server process 202. Similarly, PC request number 27–30 would be assigned to server processes 2 through 5, respectively. A PC request 31 would cause a new sixth server process to start during step 311 and proceed as previously described via steps 313 to step 305, etc.

Thus, in this second embodiment of my invention, the server program dynamically readjusts the low water (LW) and high water (HW) marks with changes in the number of client PC requests in accordance with the format specified in table T1 of FIG. 4. Moreover, in this second embodiment, there is no need for the administrator to initially set the value of N (i.e., step 300), since the system automatically starts at the lowest range of N (i.e., 401) and dynamically advances to the next range (i.e., 402) when N exceeds the maximum value of the present range.

According to yet another embodiment of my invention, as shown in FIG. 5, a busy indicator (BI) status is used to assign a client PC request to an activated server process. When the server program 122 is initialized, in step 500, the administrator selects the maximum value for busy indicator (BI). In step 501, the client PC contacts the server computer 100 over LAN 104 and in step 502 the server computer 100 receives the PC request. In step 503, control process 204 checks a busy indicator (BI) value that is maintained (as described below) for each activated server process 202, 203. In step 505, if any busy indicator (BI) value is found to be less than a maximum loading, then in step 507, the server process with the lowest busy indicator (BI) value is assigned to the new client PC to complete the procedure. In step 505, if no busy indicator (BI) value is found to be less than the maximum, then in step 509, the control process 204 activates a new server process and control is returned to step 503. Thereafter, in steps 505 and 507, the newly-activated control process is assigned the new client PC request.

The busy indicator (BI) can be implemented in many ways. The busy indicator (BI) value can, for example, be determined by quantifying, over a period of time, $t0 - tn$, the amount of time that a server process is doing work—denominated "t work"—or, alternatively, the amount of time that the server process is waiting for work-denominated "t wait". Some busy indicator (BI) possibilities include:

1) $BI = \text{total busy time} = \sum_{t0}^{tn} t\ work.$ $$0 \leq BI \leq tn - t0$$

2) $BI = \sum_{t0}^{tn} \text{number of received work requests}$

Thus, depending on the operating system or server program used by the server computer, it may or may not be easier to measure time values (e.g., busy time, wait time) rather than events (e.g., work requests). Implementation of either of these busy indicator (BI) measurement techniques is straightforward to implement.

While the operation of the present invention has been illustratively described with regard to the use of particular client PCs, server computer and LAN apparatus, it should be apparent that equivalent apparatus can be utilized as part of the arrangement. Thus, for example, the flow charts of FIGS. 3 and 5 and the table T1 of FIG. 4 of the present invention must be adapted for use with the operating system of the server computer selected for use in the arrangement. The server computer, of course, should have a UNIX system, OS/2 system or other multi-tasking capability. The present invention can also be used in an arrangement where the client PCs and server computer communicate over a bus system rather than a LAN.

What has been described is merely illustrative of the application of the principles of the present invention. Other arrangements and methods can be implemented by those skilled in the art without departing from the spirit and scope of the present invention.

What is claimed is:

1. A server apparatus for accessing one or more common resources using a plurality of server processes to which client service requests are assigned, said server apparatus comprising means for receiving an unassigned client service request requesting access to one of said common resources and means, responsive to a workload indication from each server process, each workload indication being less than a maximum workload for that server process, for assigning said unassigned received client service request to a server process having a workload indication which is less than the workload indication of all other server processes.

2. The server apparatus of claim 1 wherein said assigning means, in response to a server apparatus administrator input indicating the maximum number of clients which may make service requests to the server apparatus, determines said maximum workload indication for each server process.

3. The server apparatus of claim 1 further comprising table means including a plurality of different predetermined workload indication ranges, each range handling a maximum number of clients and each range specifying a lower and upper limit on how many client service requests can be assigned to each server process and wherein said assigning means, in response to a determined number of clients, selects a working range and determines the maximum number of client service requests that can be assigned to each server process.

4. The server apparatus of claim 3 wherein said assigning means assigns said received client service request to an activated server process which is handling less than said determined number of client service requests and starts a new server process for said received service request when said determined number has been reached for each activated server process.

5. The server apparatus of claim 3 wherein said workload indicator range includes a first number (LW) and wherein said assigning means assigns said received client service request to an activated server process having less than said first number of client service requests assigned to it and, if each activated server process has said first number of client service requests assigned to it, said server apparatus activates a new server process for said received client service request.

6. The server apparatus of claim 5 wherein said workload indicator range includes a second number (HW) and a maximum number of active client service requests (N) determined from a server apparatus administrator input and wherein a maximum number of server processes (M) activated by said server apparatus is equal to said number of active client service requests (N) divided by said second number (HW) rounded up to the next higher integer.

7. The server apparatus of claim 6 wherein when each of said M activated server processes has been activated and has said first number of client service requests assigned to it, said assigning means assigns said received client service request to the one of said M activated server processes handling the least number of client service requests.

8. The server apparatus of claim 1 further comprising a table means storing a plurality of entries, specifying a plurality of different predetermined workload indicators for establishing a plurality of workload indicator ranges, each range specifying how many client service requests can be assigned to each server process, and wherein each entry has a separate first number (LW) and second number (HW) associated therewith and, wherein a preselected number N entered by a server apparatus administrator indicates a total workload to be handled by said process servers and is used to access said table means to select an entry therein in which range said preselected number lies and the quotient of the number N and the first number (LW) being used by said assigning means to determine when to start a new server process and the quotient of the number N and the second number (HW) being used to determine the maximum number of server processes that can be started.

9. The server apparatus of claim 8 wherein, when the number (N) of client requests equals the maximum number listed for said selected entry, said received client service request is said to increment said number N and said incremented N used to select another entry from said table means.

10. The server apparatus of claim 1 further comprising a table means storing a plurality of entries, specifying a plurality of different predetermined workload indicators for establishing a plurality of workload indicator ranges, each range specifying how many client service requests can be assigned to each server process, and wherein each entry has a separate first number (LW) and second number (HW) associated therewith and, wherein at start up of said server apparatus, said assigning means uses the first number (LW) of said first entry to determine the maximum number of client service request to assign to each server process before a new server process is started and uses the second number (HW) to determine the maximum number of server processes which may be assigned to any server process.

11. The server apparatus of claim 10 wherein, when the number of client requests equals the maximum number in said range listed for said first entry, additional received client service requests are used to increment said number N and said incremented N is used to select another entry from said table means, and the associated first and second number thereof being used by said assigning means to assign said received client service request.

12. The server apparatus of claim 1 wherein said workload indication is a busy indicator (BI) which is determined for each server process and wherein said assigning means assigns said received client service request to the server process having the lowest busy indicator value.

13. The server apparatus of claim 12 wherein each busy indicator indicates the number of client service requests assigned to its associated server process over a predefined period of time.

14. The server apparatus of claim 12 wherein each busy indicator has a value which is the total work time of its associated server process over a predefined period of time.

15. The server apparatus of claim 12 wherein each busy indicator has a value determined using a total wait time of its associated server process over a predefined period of time.

16. A server apparatus for accessing one or more common resources using a plurality of server processes to which client service requests are assigned, said server apparatus comprising table means, including a plurality of different predetermined workload indicator ranges, each range specifying a lower and an upper limit on how many client service requests can be assigned to each server process, means for receiving an unassigned client service request requesting access to one of said common resources, means, responsive to a server apparatus determined total number of client service requests, for accessing said table means to select in which range said total number of client service requests lies and thus determines, for the selected range, the number of client service requests or workload that can be assigned to each server process and means, responsive to the selected range and a workload indicator for each server process, each workload indicator being less than the upper limit of said selected range, for assigning said unassigned received client service request to a server process having a workload indicator which is less than the workload indicator of all other server processes.

17. A computer network comprising a server apparatus, a plurality of client apparatuses connected to said server apparatus, said server apparatus including one or more common resources which can be accessed by a client apparatus using one of a plurality of server processes activated by said server apparatus, said server apparatus comprising means for receiving an unassigned client service request requesting access to one of said common resources and means, responsive to a workload indication from each server process, each workload indication being less than a maximum workload for each server process, for assigning said unassigned received client service request to a server process having a workload indication which is less than the workload indication of all other server processes.

18. The computer network of claim 17 wherein said workload indication is a busy indicator (BI) which is determined for each server process and wherein said assigning means assigns said received client service request to the server process having the lowest busy indicator value.

19. A computer network comprising a server apparatus, a plurality of client apparatuses connected to said server apparatus, said server apparatus including one or more common resources which can be accessed by a client apparatus using one of a plurality of server processes activated by said server apparatus, said server apparatus comprising table means including a plurality of different predetermined workload indicator ranges, each range specifying a lower and an upper limit on how many client service requests can be assigned to each server process, means for receiving an unassigned client service request requesting access to one of said common resources, means, responsive to a server apparatus determined total number of client service requests, for accessing said table means to select in which range said total number of client service requests lies and thus the number of client service requests or workload that can be assigned to each server process, and means, responsive to the selected workload indicator range and a workload indicator from each server process, each workload indicator being less than the upper limit of said selected workload indicator range, for assigning said unassigned received client service request to a server process having a workload indicator which is less than the workload indicator of all other server processes.

20. In a server apparatus, a method of accessing one or more common resources using a plurality of server processes to which client service requests are assigned, said method comprising the steps of at said server apparatus measuring a workload indication of each server process receiving an unassigned client service request requesting access to one of said common resources by way of one of said plurality of server processes and assigning, in response to a workload indication from each server process which is less than a maximum workload for each server process, said unassigned received client service request to a server process having a workload indication which is less than the workload indication of all other server processes.

* * * * *